United States Patent

Gelzer

[15] 3,645,375
[45] Feb. 29, 1972

[54] CONVEYOR SYSTEM FOR MOVING FIXTURES THROUGH A SELECTED PROGRAM

[72] Inventor: John R. Gelzer, 3042 McKinley Ave., Columbus, Ohio 43204

[22] Filed: Dec. 4, 1969

[21] Appl. No.: 882,029

[52] U.S. Cl............................................198/19, 198/165
[51] Int. Cl............................................B23q 7/00
[58] Field of Search..................198/19, 160, 165, 130–131

[56] References Cited

UNITED STATES PATENTS

| | | | |
|---|---|---|---|
| 3,125,204 | 3/1964 | Loven | 198/19 |
| 3,156,345 | 11/1964 | De Good | 198/160 X |
| 3,158,249 | 11/1964 | Harper et al. | 198/19 |
| 3,204,756 | 9/1965 | Lesch | 198/19 X |
| 3,300,028 | 1/1967 | Landreu et al. | 198/160 |
| 3,339,710 | 9/1967 | Micgielse et al. | 198/160 |

Primary Examiner—Richard E. Aegerter
Assistant Examiner—Hadd S. Lane
Attorney—Mahoney, Miller and Stebens

[57] ABSTRACT

A conveyor system comprising an endless conveyor extending through a predetermined path. Cooperating with this conveyor is an associated guide which along with the conveyor provides a continuous guideway for receiving and guiding fixtures which are adapted to support workpieces that are to be subjected to a certain program of operations. The fixtures are engaged by the conveyor and moved through the guideway at a selected speed, continuously along the greater portion of the guide path, but at the locations where the operations are to be performed, the successive fixtures are caused to stop or dwell for a predetermined period while an operation is performed on the workpieces carried thereby.

12 Claims, 12 Drawing Figures

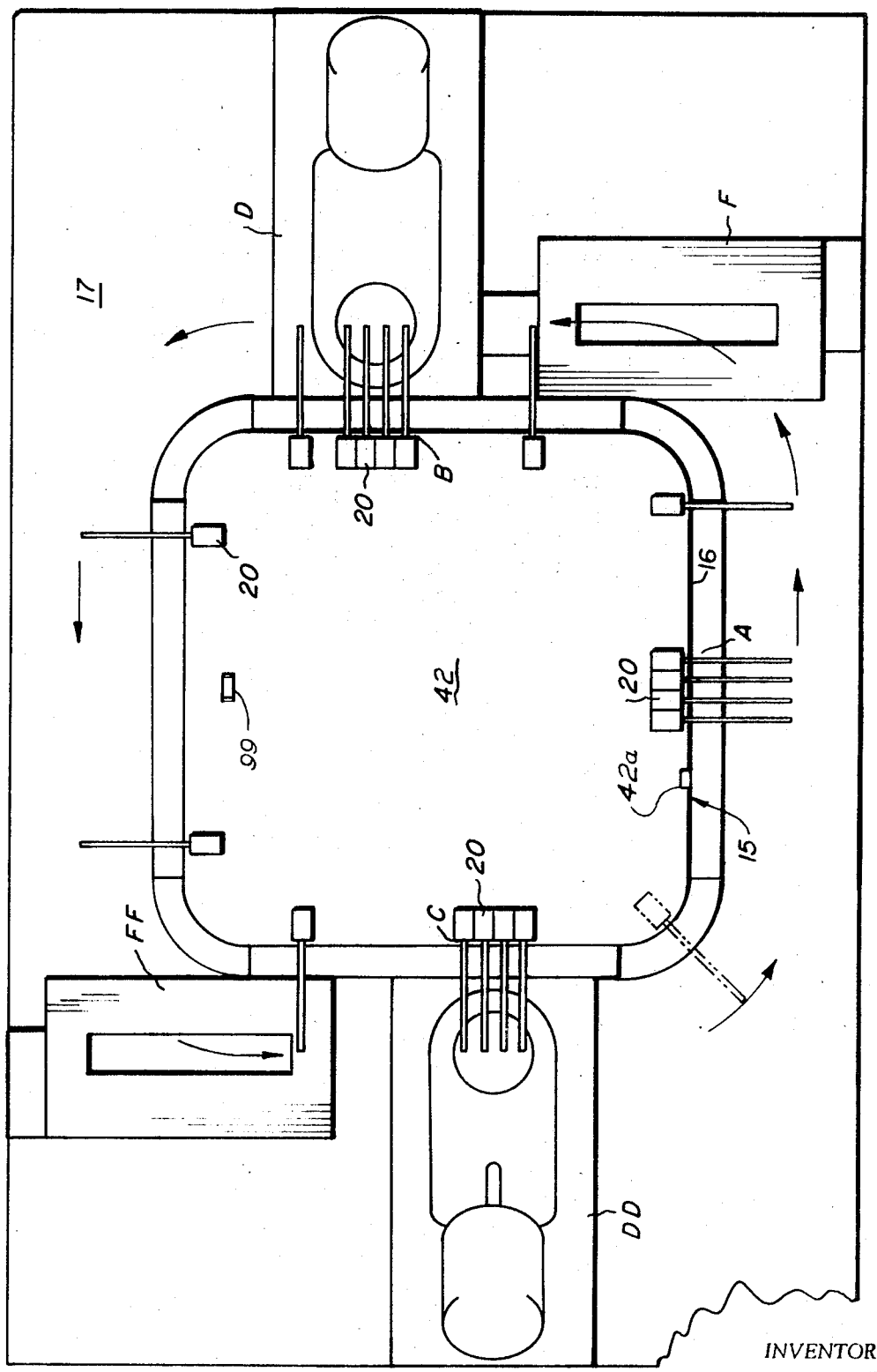

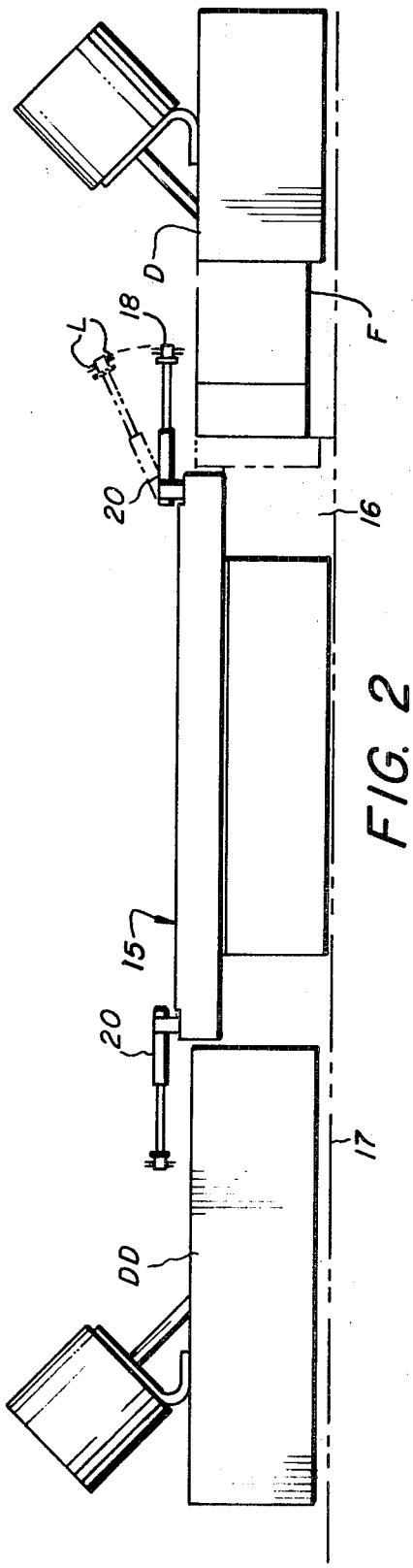
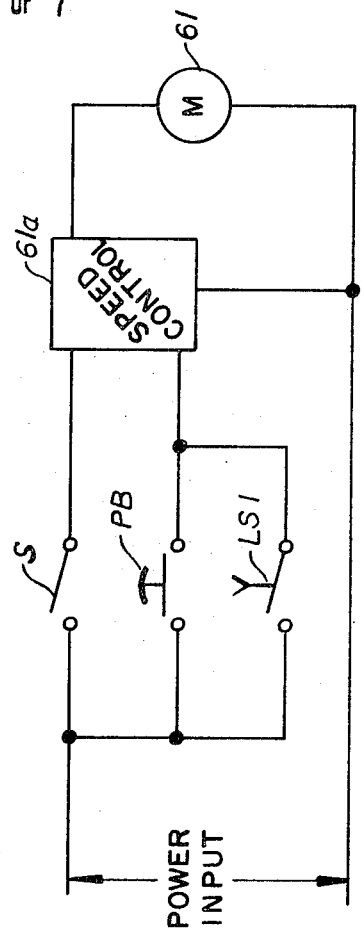
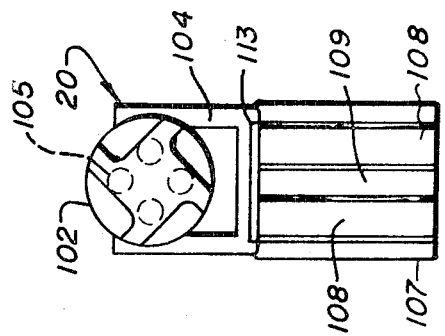

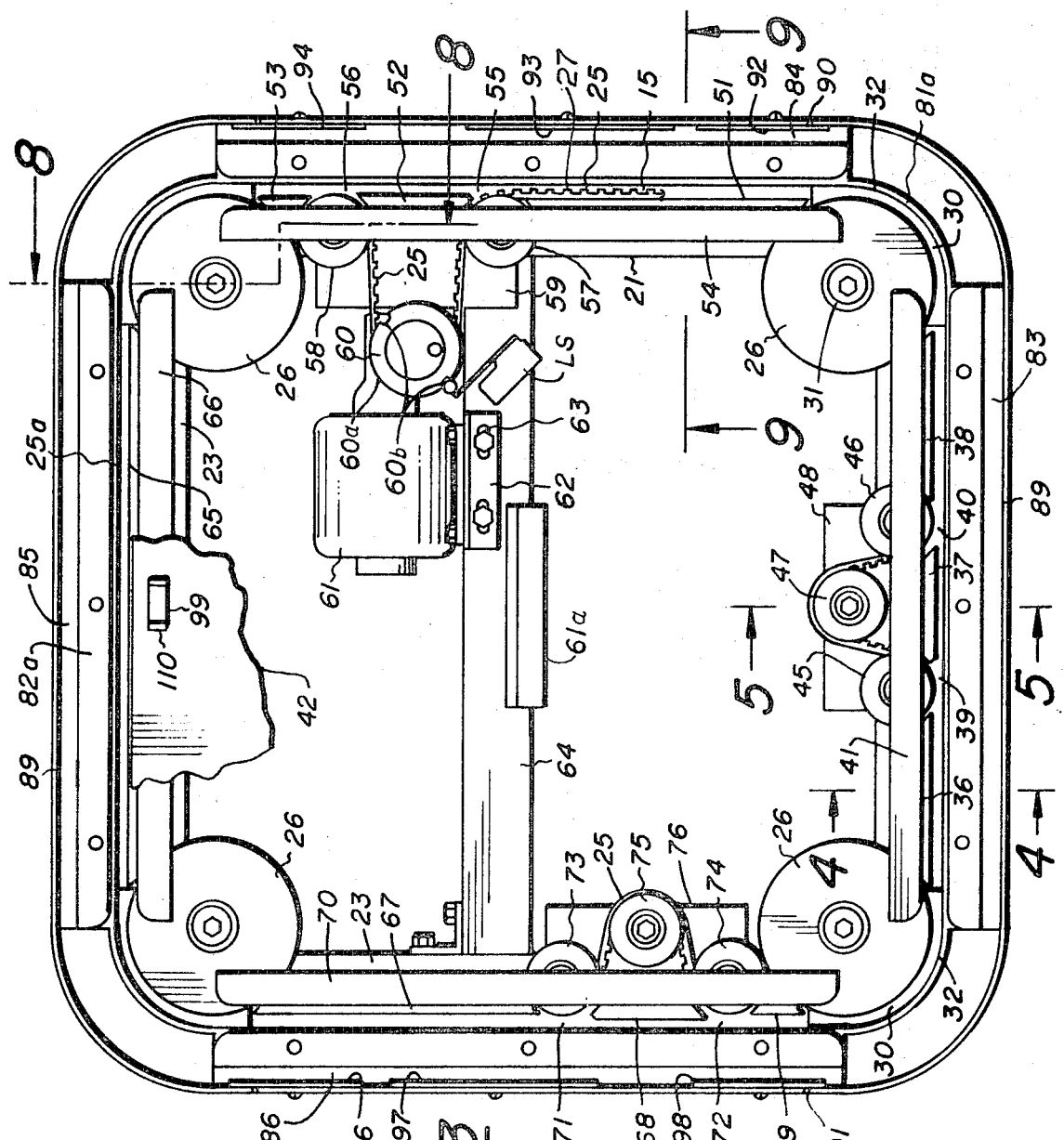

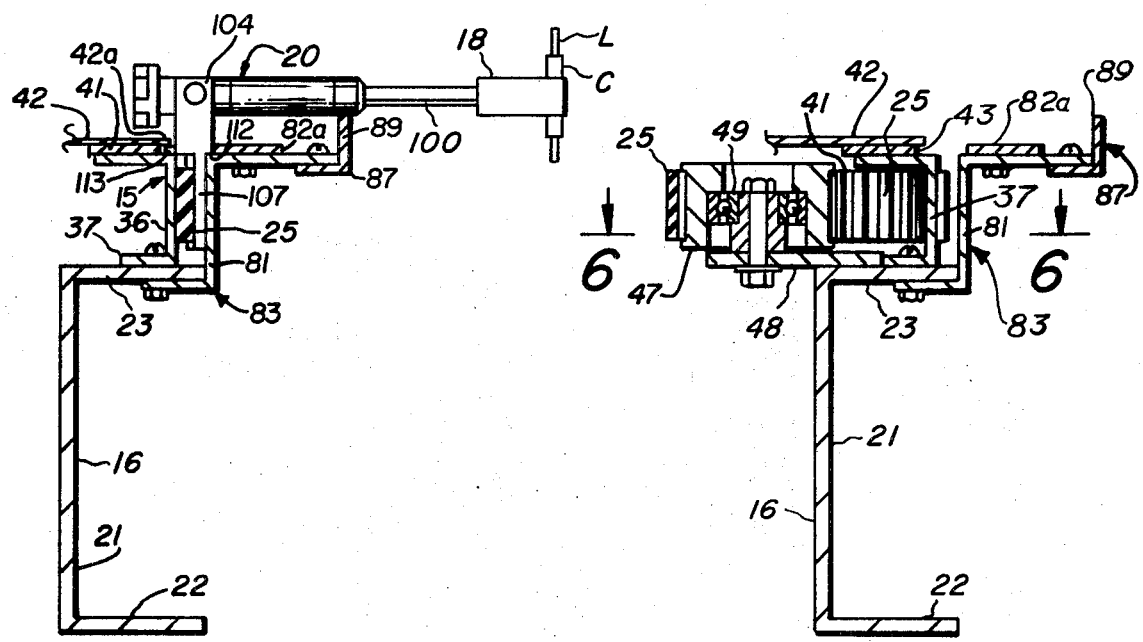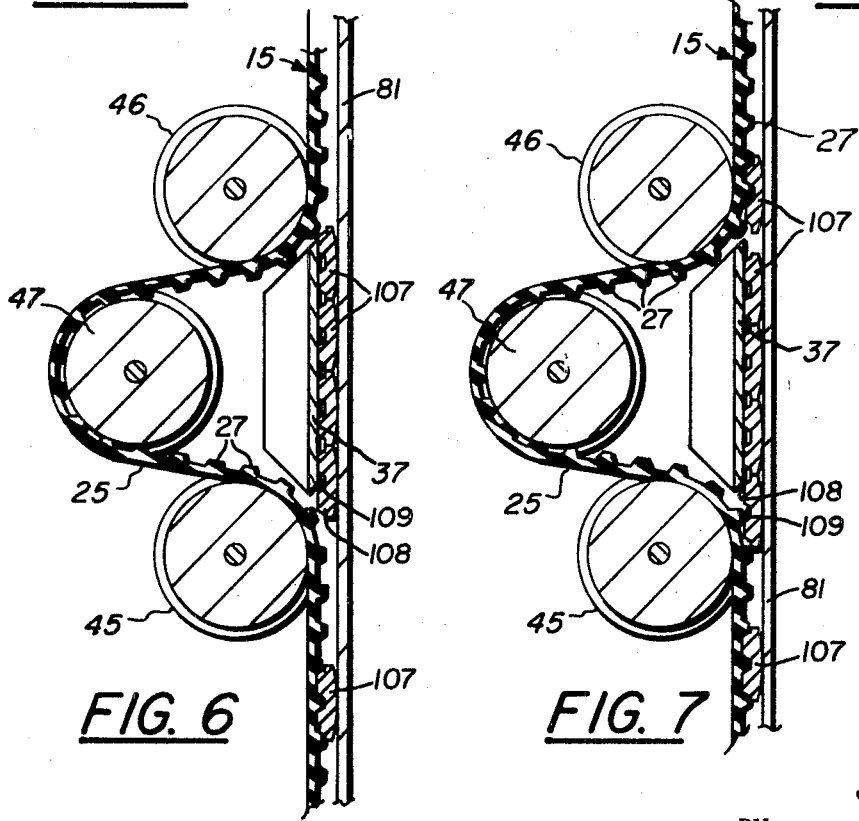

CONVEYOR SYSTEM FOR MOVING FIXTURES THROUGH A SELECTED PROGRAM

Many work operations, especially in the production of small parts in the electromechanical or electronic industry, are performed at different stations around a table or bench and require the services of a plurality of operators at the respective stations or the movement of a single operator to the successive stations around the table. The present invention makes it possible for each operator to be constantly located at one station, where manual work operations occur, this being accomplished by providing a conveyor system which extends around the table and moves work-carrying fixtures around the table to the successive work stations. At successive work stations, the fixtures are caused to automatically stop or dwell for predetermined periods, at which times, the workpieces carried thereby are subjected to certain operations by an operator or automatically. The conveyor system of the present invention is not limited to any specific industry and to any particular number of work operations or treatments. Also, the endless conveyor of the system can assume various configurations depending on the location of the various work units. Furthermore, it can be designed to receive any type of fixture depending on the nature of the workpiece to be carried. Any suitable number of fixtures may be mounted on the conveyor system and may be removed and replaced as desired. Also, each fixture may be designed so that it can cooperate with the conveyor and associated control means to have linear or curvilinear motion normal to the plane of movement of the conveyor, which will be a vertical motion if the conveyor is in horizontal position, as well as rotational movement about a fixture axis in the plane of motion of the fixture, these movements resulting from the advancing movement of the conveyor.

The best mode contemplated for carrying out this invention is illustrated in the accompanying drawings in which:

FIG. 1 is a schematic plan view of the conveyor system showing it in association with certain work-performing units.

FIG. 2 is a side elevational view of the system of FIG. 1.

FIG. 3 is an enlarged plan view of the conveyor system with the top cover plate cut away to show details of the conveyor.

FIG. 4 is an enlarged transverse vertical sectional view taken along line 4—4 of FIG. 3.

FIG. 5 is an enlarged transverse vertical sectional view taken along line 5—5 of FIG. 3.

FIG. 6 is a horizontal sectional view taken along line 6—6 of FIG. 5 illustrating one of the dwell pocket arrangements of the conveyor.

FIG. 7 is a view similar to FIG. 6 but showing a bank of the fixtures in the dwell pocket as one enters and one leaves the pocket.

FIG. 10 is an end elevational view of a suitable fixture used in the system.

FIG. 12 is a schematic view of the electric circuit of the conveyor system.

Figure 8:
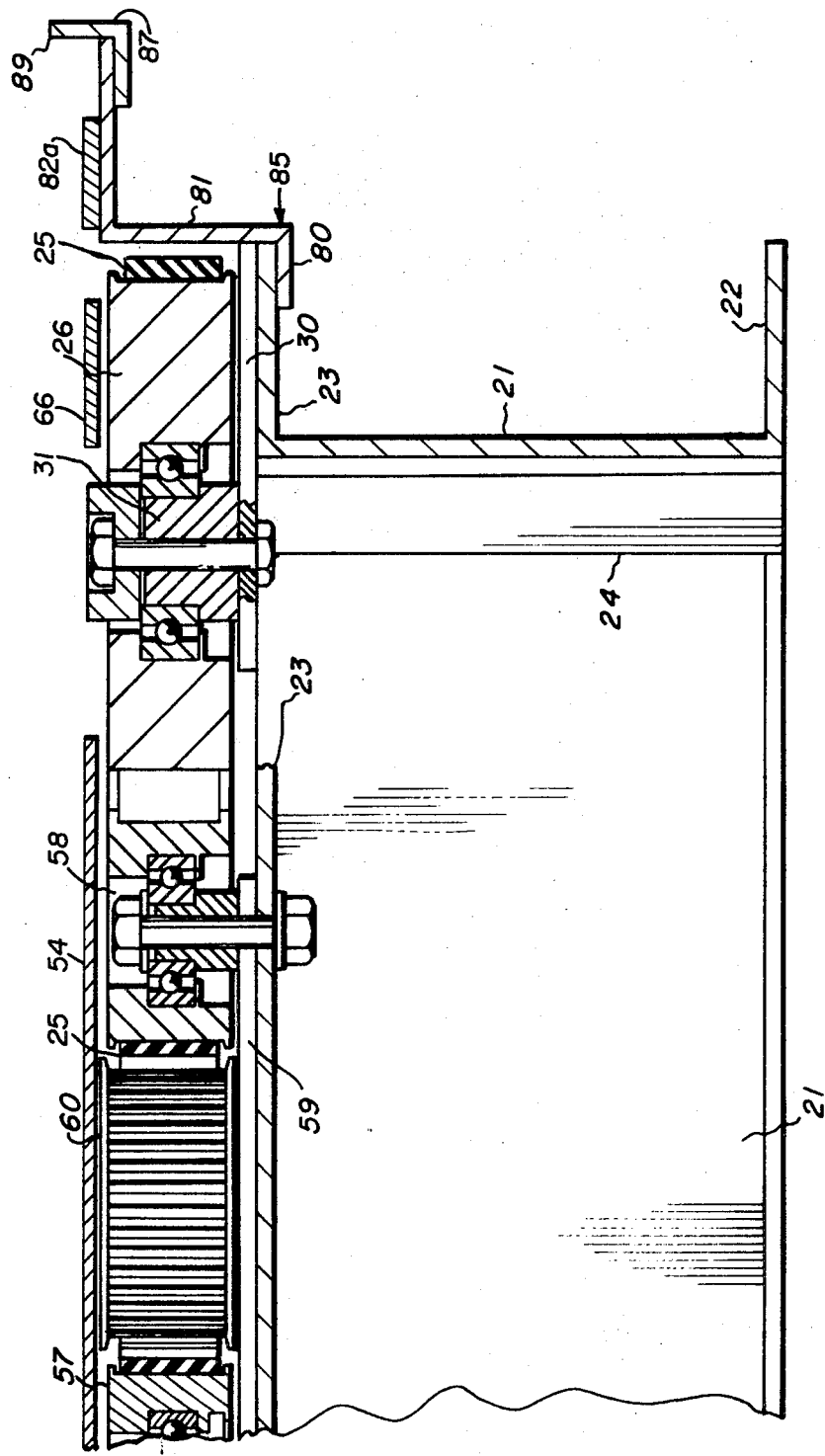
FIG. 8 is a vertical sectional view taken along line 8—8 of FIG. 3.

With particular reference to the drawings, in FIG. 1 there is shown the general arrangement of a conveyor system 15, in accordance with this invention, which is disposed in a housing 16, that, in this example, is adapted to be horizontally disposed on a table top 17 and is of square outline in plan view. Supported around the housing at successive intervals on the table may be work-treating units which, in the illustrative arrangement shown, are for solder-coating leads L (FIGS. 2 and 4) on the opposite ends of axial components C carried in chuck heads 18 on the outer ends of fixtures 20 suitably mounted in a selected number on the conveyor system 15. The conveyor will move the fixtures 20 in the direction indicated by the arrow path in FIG. 1, which illustrates the path of the work as it passes in a substantially square path through an associated or contiguous guideway from and back to a station A, which may be the loading and unloading station for workpieces. From the station A, the fixtures will be moved by the conveyor past successive stations B and C, where at each of which a group or bank of fixtures will accumulate and there will be a dwell period in their movement around the housing. During this movement around the housing, the workpieces will move into cooperation with a fluxer F, a wave dipper D, a second fluxer FF and a second wave dipper DD, suitably arranged at successive intervals around the housing. Vertical movement may be imparted to the workpieces at proper intervals as they move into and out of cooperation with the successive units F, D, FF, and DD and between the units D and FF, each of the workpieces may be rotated 90° one or more times about its axis so that the units D and DD will solder opposite leads L of the component C if the total rotation is one hundred and eighty degrees. A guideway for removably receiving the fixtures 20 is provided around the upper edge of the housing by a belt 25 and associated guide members, the belt and associated backup members providing the inner side of the guideway and outwardly spaced guide members providing the outer side thereof, resulting in a guideway or slot extending around the housing, in a substantially square path in the example shown in the drawings. This guideway will open upwardly to permit insertion and removal of the fixtures and the belt will interlock with the fixtures so as to move them along the guideway.

More specifically, the housing 16 is square and is formed mainly by four outwardly turned channel-type walls and joined at the corners of the housing by four angle brackets 24 (FIG. 8). As shown best in FIGS. 4, 5 and 8, each housing wall includes a vertical web 21, a lower base flange 22 and an upper support flange or shelf 23. The conveyor itself is provided by an endless gear belt 25 which is mounted along the upper edge of the housing on main idler pulleys 26 located at each corner of the housing (FIG. 3). The belt is provided with teeth 27 formed across the width of its outer longitudinal surface and its smooth inner surface passes around the flanged pulleys 26. However, if desired, the inner surface could be provided with teeth and the pulleys correspondingly formed with meshing teeth. Each pulley 26 is supported on a corner shelf or plate 30 (FIGS. 3 and 8) by a shaft and bearing unit 31 providing a vertical axis of rotation, the plate being suitably secured to the two adjacent flanges 23 on which it rests. It will be noted that the outer edge of the plate 30 is so curved at 32 (FIG. 3) that it will lie inwardly of the path of the belt 25 as it passes around the idler 26.

Means is provided for backing up the belt 25 at the four sides of the housing 16. This means includes a series of channel members disposed along each of the housing sides inwardly of the belt. Each channel is turned inwardly away from the belt and includes (FIG. 9) an outer vertical web 33, a lower flange 34, and an upper flange 35, the web being slightly greater in height than the upright belt 25 and the flange 34 resting on the associated upper flange 23 of the housing side and being suitably attached thereto.

At the front side or side where the station A is located, there are three of the channels which are designated 36, 37 and 38, disposed in spaced relationship with the members 36 and 38 being identical and disposed adjacent the associated pulleys 26, and with the member 37 disposed intermediate the members 36 and 38 and being spaced therefrom to provide belt passages 39 and 40. As will later appear, a fixture accumulating or dwell pocket is provided at the station A along the member 37. Attached to the upper flanges of the channel members 36, 37 and 38 is a longitudinal strip 41 which serves as a spacer upon which a substantially square cover plate 42 rests for covering the top side of the housing. As indicated in FIG. 5, the outer edge of the strip 41 terminates short of the outer face of the associated channel and of the outer edge of the cover 42 to provide an inwardly opening guide groove 43 extending along the cover plate.

As indicated in FIG. 3, at the space 39 between the members 36 and 37, a flanged idler pulley 45 is provided; at the space 40 between the members 37 and 38 a similar pulley 46 is provided, and between these two pulleys and inwardly thereof is a third flanged idler pulley 47, all of these pulleys being supported on a plate 48 by shaft and bearing units 49 (FIG. 5) with their axes vertical. The axes of the pulleys 45 and 46 will be in alignment and located so that their belt-engaging peripheries are in alignment with the outer surfaces of the backup members 36 and 38. It will be noted that member 37 is set outwardly relative to the members 36 and 38 substantially the thickness of the belt exclusive of the tooth profile. The plate 48 is suitably fixed (FIG. 5) to the adjacent upper flange 23 of the housing wall and extends inwardly thereof. Therefore, at the station A, the belt 25 will pass from the backup member 36 inwardly through the space 39 and around the pulley 45, on around the pulley 47, outwardly to and around the pulley 46 and then out through the space 40 and along the member 38.

With reference to FIG. 3, at the next side of the housing in the direction of advance of the belt 25, between the two pulleys 26, successive channels 51, 52 and 53, which are like the channels previously referred to, are provided and are secured at their lower sides to the adjacent housing flange 23 and support at their upper sides the strip 54 (FIG. 9) which is like the strip 41. Between the member 51 and the outwardly offset member 52 is a belt-passage space 55 and between the member 52 and the member 53 is a belt-passage space 56. At these spaces 55 and 56, the respective pulleys 57 and 58, like the pulleys 45 and 46, are mounted on a plate 59, which is secured to the adjacent housing flange 23 and extends inwardly. Intermediate the pulleys 57 and 58 and inwardly thereof, is a flanged and grooved drive pulley 60 which is carried by and driven by an electric motor unit 61. This motor unit is carried by a bracket 62 (FIG. 3) which is mounted by means of a bolt and slot connections 63 on a brace 64 extending between two of the housing walls. The belt 25 will pass from the member 51 into and through the space 55 and around the pulley 57, inwardly around the drive pulley 60, outwardly around the pulley 58 and through the space 56 and then along the member 53 to the next corner pulley 26. The motor unit 61 can be adjusted in and out to correspondingly move the drive pulley 60 to vary the tension on the belt 25 and the length of the belt loop portion engaged by pulleys 57, 58 and 60. This pulley arrangement is located at the station B and along the member 52 there will be provided a fixture-accumulating or dwell pocket.

At the next side of the housing, the backup means for the belt 25 consists of a single channel member 65 which extends between the two pulleys 26. This member is secured to the adjacent housing wall and carries on its upper surface the spacer strip 66 which is like the strips 41 and 54.

The channel means provided at the next side of the housing is substantially identical with that provided at the opposite side of the housing and consists of the end backup channels 67, and 69, and the intermediate outwardly offset channel 68, arranged between the pulleys 26 on the upper edge of the corresponding housing side and carrying the spacer strip 70 on their upper flanges. Between the members 67 and 68 is a belt-passage space 71 and between the members 68 and 69 is a belt-passage space 72, and associated with these spaces are the flanged idler pulleys 73 and 74. Between the pulleys 73 and 74 and inwardly thereof is a flanged idler pulley 75. All these pulleys are carried by a plate 76 which is attached to the top flange 23 of the housing side. The belt 25 will pass from the member 70 around the pulley 73, through the space 71 inwardly and around the pulley 75, then outwardly around the pulley 74, through the space 72 and along the member 69 to the next pulley 26. This pulley arrangement will be at the station C and along the member 68 there will be provided a fixture-accumulating or dwell pocket.

Figure 9:
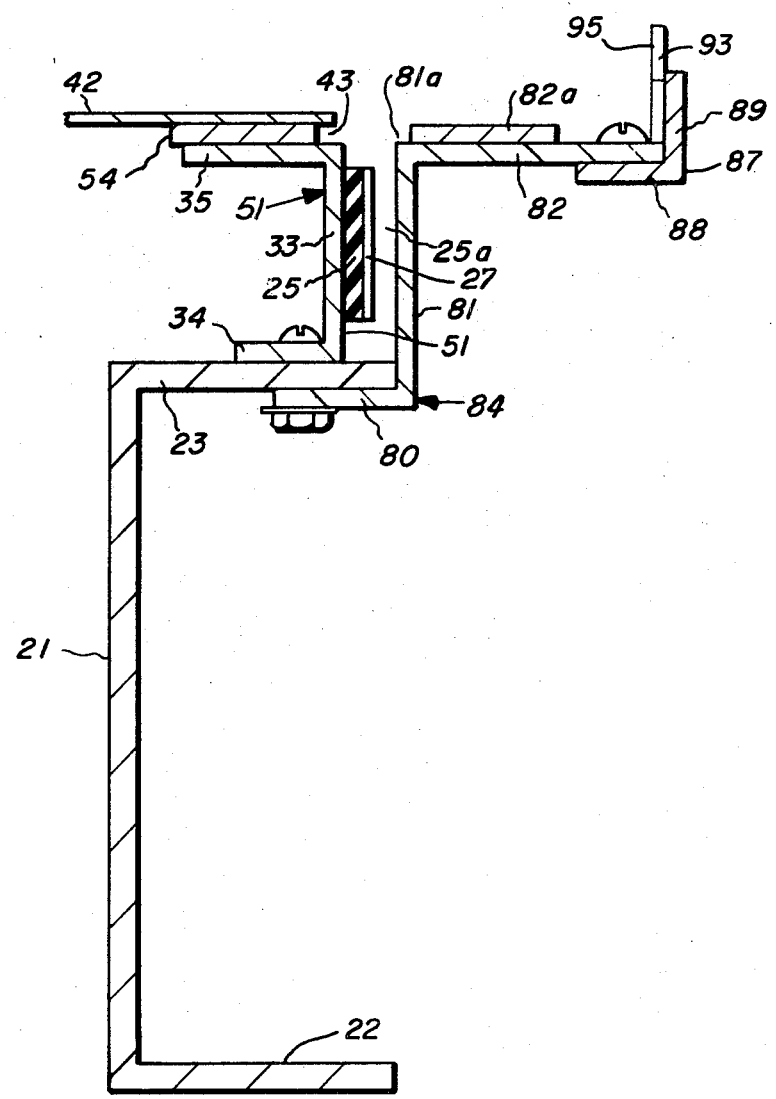
FIG. 9 is an enlarged transverse vertical sectional view taken along line 9—9 of FIG. 3.

As previously indicated, the belt 25, backed up by the various channel members, provides an inner moving wall of the fixture guideway. The outer fixed wall of the guideway is provided by Z-shaped angles which are attached to the upper flange 23 of the respective sides of the housing. Each of these angles, as indicated in FIG. 9, comprises a lower inwardly directed flange 80 which extends beneath the flange 23 and is suitably secured thereto, an upstanding web or flange 81 and an outwardly directed flange 82 all being disposed in right-angular relationship. The web 81 engages the outer edge of the flange 23 and is disposed in upright parallel relationship with the web 33 and is of substantially the same height. The result is the complete upwardly opening guideway or slot 25a for receiving a depending portion of each fixture, the belt 25 extending along all portions of the guideway except at the fixture-accumulating pockets. Carried on the upper surface of the flange 82 is a spacer-plate 82a which is of the same thickness as the spacer plate carried by the opposed flange 35 and which terminates short of the inner surface of the web 81 to provide an exposed fixture guide shoulder 81a. The opposed spacer plates on opposite sides of the guideway are spaced apart so that they provide an accurately continuous guide slot for the fixtures particularly where the fixtures enter or leave a fixture-accumulating pocket.

As indicated in FIG. 3, at the front side of the housing or the side where the station A is located, a Z-shaped angle member 83 is provided which extends from axis to axis of the two pulleys 26 at that side. At the next side, or side where the station B is located, a similar angle member 84 is provided extending between the respective pulleys 26 at that side. At the third or rear side a similar angle member 85 is provided and at the fourth side or side where the station C is located, another angle member 86 is provided. To provide a continuation of the web 81, which forms the outer wall of the guideway, curved corner pieces 81a are provided at each corner concentric with the associated pulley 26 and extending between the webs 81 of the respective Z-shaped angle members with their ends fixed in alignment with the cooperating webs 81.

The various angle members 83, 84, 85 and 86 also carry various portions of a cam rail which is to control vertical movement of the fixtures and the workpieces carried thereby during the operations at the various units F, D, FF, and DD and to keep them in a horizontal plane at other times during travel around the table. Thus, the member 83 carries along its outer edge an angle member 87 which includes an inwardly directed flange 88 and an upwardly directed flange 89. The flange 88 extends beneath and is secured to the flange 82 of the associated Z-shaped guide angle with the flange 82 contacting the upstanding flange 89. The upstanding flange 89 will serve as a cam rail and it will be noted in FIG. 3 that the ends of this flange 89 extend beyond the ends of the member 83 around each corner being concentrically curved relative to the respective pulleys 26 and terminating at the points 90 and 91. The upstanding flange 89 on the member 84 carries the cam members 92, 93, and 94 at longitudinally spaced intervals which extend above the flange and which are provided with inclined ends, one of which is indicated at 95 in FIG. 9. These cams will serve to lift the workpieces to higher levels for certain operations. The cam rail flange 89 at the rear on the member 85 is the same as the one on the front member 83. However, at this rear side there will be a fixture rotating cam 99 which will be carried by the cover 42 adjacent the guideway 25a. The upstanding flange 89 on the member 86 at the next side is provided with upstanding cams 96, 97 and 98, like the cams carried by the member 84 at the opposite side.

Figure 11:
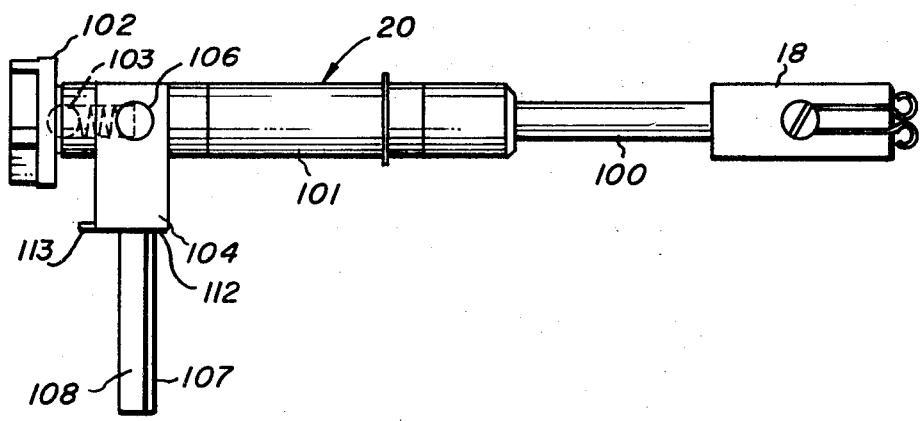
FIG. 11 is a side elevational view of the fixture.

As previously indicated, the continuous guideway or slot 25a is designed to receive a number of fixtures 20 of a suitable type which will hold the work pieces and which will be moved along the guideway. Various fixtures may be used, but one of a suitable type is illustrated in FIGS. 10 and 11. This fixture, as previously indicated, includes a head or chuck 18 which may be of a suitable type and is mounted on the outer end of a shaft 100. The shaft 100 is mounted for rotation about its axis in a bearing sleeve 101. Keyed on the inner portion of this shaft is an indexing wheel 102 and between this wheel and the inner end of the sleeve 101 is a spring-pressed ball-type indexing detent plunger 103 which will index rotation of the shaft 100, and the head 18 carried thereby, at successive 90° positions, as determined by the four ball sockets 105 provided on the inner surface of the wheel cooperating with the balls mounted on the adjacent end of the sleeve 101.

The sleeve 101 is shown mounted for vertical swinging movement about a transverse pivot 106 on the upper end of a bracket 104. Depending from this bracket is a guide tongue 107 which is adapted to extend downwardly into the guideway 25a. On its inner surface, the tongue 107 is provided with alternating ribs 108 and slots 109 to provide a surface which will interfit with the gear surface or tooth side of the belt 25. The tongue 107 will thus be so formed that it can be slipped downwardly into the guideway 25a to interengage with the belt 25 so that it will be moved along the guideway thereby, but can be easily removed from the guideway when desired by withdrawing it upwardly. The fixture tongue 107 (FIG. 11) will have a shoulder 112 which will rest on the guide shoulder 81a and a lateral shoulder 113 which will extend into the guide groove 43 which will determine the lowermost position of the fixture. Near the station A (FIG. 1), there will be a slot 42a in the cover 42, to permit insertion and withdrawal of the fixtures relative to the guideway 25a. The vertical position of the fixture shaft 100 about the fixture point 106 will be determined by the guide rail 89 and the associated cams 92, 93, 94, 96, 97 and 98. The rotative position of the shaft 100 about its own axis will be determined by a pair of cam portions 110 on the ends of the cam member 99 (FIG. 3), engaging the wheel 102 and rotating it successively through 90° increments.

As previously indicated, the system may be designed to receive any desired number of fixtures. Also, the fixture-accumulating dwell or idling pockets may be in any suitable number and may be designed to receive any particular number of fixtures. In the particular example shown, 22 fixtures in all will be used and four will accumulate successively in each pocket. The fixtures will be moved by the continuous movement of the belt 25 and to vary the speed of movement of the fixtures, the drive motor 61 may be equipped with a speed-varying unit 61a. The fixtures will be moved continuously by the belt until they reach any of the three dwell or idling pockets at the stations A, B, and C. Just ahead of the one idling station A, the fixtures can be loaded or removed through the cover slot 42a. At the idling stations B and C, certain operations are performed, in the example shown, each being a dipping operation. The fixtures will accumulate in each dwell or idling pocket and will remain there a sufficient time until a fixture entering the pocket (FIG. 7) pushes the leading one of the accumulated fixtures out of the pocket where it will be engaged again by the belt 25. While in the pocket, the fixtures will be free of the belt, as it is desired around the pocket by the respective pulley arrangements at the stations A, B and C. At and adjacent the station F there will be vertical movement of each successive fixture by the cams 92, 93 and 94 and similar movement will be provided at and adjacent the station FF by the cams 95, 96 and 97. Workpieces can be placed on or removed from the fixture chucks 18 manually or automatically at the station A. The fixtures will be automatically moved out of each dwell or idling pocket after a suitable number has accumulated therein. Automatic movement of each fixture, after a predetermined dwell period, thus occurs. The continuously moving fixtures will be in predetermined positions around the system and this will vary with variations in numbers of fixtures in the system. The fixtures will be automatically moved out of each dwell or idling pocket after a suitable number has accumulated therein. This is due to the fact that each pocket is of a length to permit a predetermined number of fixtures to accumulate therein. After such a number accumulates in a pocket, forcing of an additional fixture into the pocket by the belt at the entrance end will result in advancing movement of the bank of accumulated fixtures and movement of one out at the exit end to again be engaged by the belt. Thus, the fixtures move through the pockets in successive steps but remain stationary during the intervals between the arrival of fixtures. The length of each loop of the belt must be adjusted precisely so that teeth on the belt loop synchronize, that is mesh or match, exactly with the teeth on the accumulated fixtures as they are advanced. This mesh requirement is analogous to the match which must occur between any conventional tooth gears or between a tooth and a flat rack of gear teeth. The various pulleys 45 and 46, 57 and 58, and 73 and 74 may be adjusted along the line of motion to govern the tension in the belt after the match at each loop has been established.

A simplified schematic diagram for an electrical control circuit incorporated in the apparatus for controlling operation of the motor 61 in driving the conveyor belt in accordance with a desired operating sequence is shown in FIG. 12. This electric control circuit is seen to comprise generally an electric motor 61 which is selectively interconnectable with a suitable electric power source through a speed-varying or speed-control unit 61a and several selectively operable switches. The speed control unit 61a is selectively adjustable and is operable to apply a specific voltage to the motor 61 and thus drive the pulley 60 and interconnected belt 25 at a desired speed. In the present embodiment, the apparatus is designed to utilize alternating current power and the speed control unit also includes a rectifier circuit (not shown or otherwise described) which converts this power to direct current and thus more readily controls the speed of operation of the motor which operates on direct current. A manually adjustable control (not shown) is incorporated in the speed control unit 61a for setting the apparatus at the desired speed. Electrical leads or conductors are not shown in the figures of the drawing other than FIG. 12.

For energization of the control circuit for normal operation, a manually operated switch S is interposed in the input power circuit. Closing of this switch connects the speed control unit 61a and the motor 61 to the power source for energization thereof and driving of the conveyor.

In some instances, such as initially setting up the conveyor for a specific operation, it is desirable that the conveyor be driven in predetermined increments so as to advance the conveyor by a station at the slot 42a where the fixtures may be inserted or removed at the same linear spacing along the belt. This is accomplished by a circuit comprising a normally open, pushbutton type switch PB and a mechanical limit switch LS which is responsive to and senses an incremental progression of the conveyor belt. This limit switch LS has a set of normally open contacts LS1 connected in shunt relationship with the contacts of the manual switch PB. In this embodiment, the limit switch LS is located adjacent the driving motor 61 (see FIG. 3) and includes an actuating lever arm engageable with a cam 60a mounted on the driving pulley 60. The cam is provided with two detents 60b that engage the lever arm and operate the switch. Assuming that the motor 61 has stopped with the actuating lever of the limit switch LS in one of the two detents 60b formed in the cam 60, the limit switch contacts LS2 will be open and the motor will not be energized. Momentarily closing of the switch PB will energize the motor 61 and revolve the cam 60a to pivot the actuating lever closing the contacts LS1 of the limit switch. With the contacts LS1 of the limit switch thus closed, the motor 61 will remain energized and drive the conveyor belt 25 and the cam 60a for the specified increment of travel and will automatically be deenergized when the actuating lever of the limit switch drops into the next cam detent 60b causing the associated limit switch contacts to open. This provides automatic spacing of fixtures through driving of the belt in predetermined increments and it will be apparent that the spacing may be adjusted for a specific installation by changing the particular cam to have a greater or less number of detents.

Thus, this invention provides an endless conveyor extending through a selected path which is formed by a moving belt and associated guide means which provide a guideway or slot in which the fixtures are moved. Along this guideway are pockets where groups of the fixtures accumulate, with each fixture remaining in the pocket for a predetermined period, as it is advanced slightly therein, until moved out of the pocket completely by the succeeding advancing fixtures.

Having thus described this invention, what is claimed is:

1. A conveyor system comprising a plurality of fixtures, an endless conveyor engageable with said fixtures supported for movement along a predetermined path, guide means extending along said conveyor and cooperating therewith to provide a guideway for receiving said fixtures to be engaged by said conveyor and moved along the guideway in said predetermined path, at least one pocket provided along the guideway where at least one of said fixtures can dwell for a period of time, supporting means being provided for said conveyor and having an arrangement adjacent said pocket for detouring said conveyor around said pocket so that said fixtures are disengaged from said conveyor when in said pocket, said pocket defining a space having a lineal dimension along said path and between points of disengagement and engagement of a fixture with said conveyor greater than that portion of said fixture engaged by said conveyor so that subsequent movement of another of said fixtures into said pocket by said conveyor will advance said fixtures in said pocket and will move one of said fixtures out of said pocket to again engage said conveyor and be moved thereby, and means for driving said conveyor.

2. A conveyor system according to claim 1 in which said conveyor is a gear belt having at least one gear surface that interfits with said fixtures to positively move them and wherein said supporting means for said conveyor comprises a plurality of pulleys around which said belt is trained, at least one of said pulleys being driven and having a complemental gear surface engaging the gear surface of said belt.

3. A conveyor system according to claim 2 in which an electric motor drives said driven pulley, and which includes a variable speed means cooperating with said motor.

4. A conveyor system according to claim 3 in which an electric circuit for the motor is provided which includes the motor and the variable speed means, said circuit including means for actuating the motor to cause it to drive the conveyor in predetermined increments.

5. A conveyor system according to claim 1 in which said detouring arrangement for the belt comprises a pair of aligned pulleys located at the respective ends of said pocket and engaging the outer surface of the belt, and an intermediate gear pulley offset outwardly from the other pulleys and engaging the inner gear surface of the belt.

6. A conveyor system according to claim 5 in which said guide means include a plurality of belt backup members provided along the belt and which terminate adjacent the respective ends of the pocket to provide spaces through which the belt may pass outwardly from the guideway and then return to the guideway, and a guide in said pocket extending between said spaces for cooperating with an opposed outer guide of the guideway in guiding said fixtures as they are advanced through said pocket.

7. A conveyor system according to claim 2 in which said conveyor is disposed in a horizontal plane and the guideway is in the form of an upwardly opening guide slot for receiving said fixtures, each of said fixtures including a guide tongue extending down into said guide slot and having a surface engaged by the gear surface of said belt which interfits therewith.

8. A conveyor system according to claim 7 in which said fixtures have a support pivotally connected to said tongue for vertical swinging movement, and which includes a cam rail extending along said guide slot for controlling vertical swinging movement of said support.

9. A conveyor system according to claim 8 in which said support includes a sleeve for rotatably supporting a shaft that carries a work supporting head, an indexing cam carried by said shaft for rotating it about its own axis, and cam means along said guide slot for engaging said cam and indexing said shaft.

10. A conveyor system according to claim 7 in which said guide means comprises shoulders adjacent each side of the guideway which interfit with portions of the fixtures to prevent vertical displacement of the fixtures from the guideway.

11. A conveyor system according to claim 10 in which said shoulders are omitted at a selected location along the guideway to permit insertion or removal of said fixtures relative to said guideway.

12. A conveyor system comprising a plurality of fixtures, an endless gear-belt conveyor having at least one gear surface engageable with said fixtures supported in a horizontal plane for movement along a predetermined path to positively move said fixtures, guide means extending along said conveyor and cooperating therewith to provide a guideway in the form of an upwardly opening guide slot for receiving said fixtures to be engaged by said conveyor and moved along the guideway in said predetermined path, at least one pocket provided along the guideway where at least one of said fixtures can dwell for a period of time, supporting means being provided for said conveyor including a plurality of pulleys around which said conveyor is trained and having an arrangement adjacent said pocket for detouring said conveyor around said pocket so that said fixtures are disengaged from said conveyor when in said pocket, said pocket designed so that subsequent movement of another of said fixtures into said pocket by said conveyor will advance said fixtures in said pocket and will move one of said fixtures out of said pocket to again engage said conveyor and be moved thereby, means for driving said conveyor that includes at least one of said pulleys being driven and having a complemental gear surface engaging the gear surface of said belt, each of said fixtures including a guide tongue extending down into said guide slot and having a surface engaged by and interfitting with the gear surface of said belt, a support pivotally connected to said tongue for vertical swinging movement and including a sleeve for rotatably supporting a shaft that carries a work supporting head an an indexing cam carried by said shaft for rotating it about its own axis, cam means disposed along said guide slot for engaging said cam and indexing said shaft and a cam rail extending along said guide slot for controlling vertical swinging movement of said support.

* * * * *

UNITED STATES PATENT OFFICE
CERTIFICATE OF CORRECTION

Patent No. 3,645,375      Dated February 29, 1972

Inventor(s) John R. Gelzer

It is certified that error appears in the above-identified patent and that said Letters Patent are hereby corrected as shown below:

Column 5, line 48, cancel "desired" and substitute therefor --detoured--.

Column 6, line 4, cancel "tooth" and substitute therefore --toothed--.

Signed and sealed this 25th day of July 1972.

(SEAL)
Attest:

EDWARD M. FLETCHER, JR.
Attesting Officer

ROBERT GOTTSCHALK
Commissioner of Patents